United States Patent
Ansari et al.

(10) Patent No.: US 11,074,735 B2
(45) Date of Patent: Jul. 27, 2021

(54) MULTISTEP INTERACTIVE IMAGE GENERATION UTILIZING KNOWLEDGE STORE

(71) Applicant: International Business Machines Corporation, Armonk, NY (US)

(72) Inventors: Ghulam Ahmed Ansari, Bangalore (IN); Amrita Saha, Bangalore (IN); Srikanth Govindaraj Tamilselvam, Chennai (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/656,347

(22) Filed: Oct. 17, 2019

(65) Prior Publication Data

US 2021/0118211 A1   Apr. 22, 2021

(51) Int. Cl.
| | |
|---|---|
| *G06T 11/60* | (2006.01) |
| *G06K 9/62* | (2006.01) |
| *G06K 9/72* | (2006.01) |
| *G06N 5/02* | (2006.01) |
| *G06N 20/00* | (2019.01) |

(52) U.S. Cl.
CPC ............ *G06T 11/60* (2013.01); *G06K 9/6215* (2013.01); *G06K 9/726* (2013.01); *G06N 5/02* (2013.01); *G06N 20/00* (2019.01); *G06T 2200/24* (2013.01)

(58) Field of Classification Search
CPC combination set(s) only.
See application file for complete search history.

(56) References Cited

U.S. PATENT DOCUMENTS

| 8,830,225 B1 * | 9/2014 | Karakotsios | G06T 15/00 345/419 |
|---|---|---|---|
| 9,063,563 B1 * | 6/2015 | Gray | G06F 3/041 |
| 2014/0267011 A1 * | 9/2014 | Devries | G06F 3/017 345/156 |
| 2016/0012624 A1 | 1/2016 | Taki et al. | |

(Continued)

OTHER PUBLICATIONS

Ramesh Manuvinakurike et al., "DialEdit: Annotations for Spoken Conversational Image Editing", Proceedings of the 14th Joint ACL-ISO Workshop on Interoperable Semantic Annotation, Aug. 2018, 10 pages.

(Continued)

*Primary Examiner* — Wesner Sajous
(74) *Attorney, Agent, or Firm* — Ference & Associates LLC (57) ABSTRACT

One embodiment provides a method, including: receiving, from a user, input for manipulating an image, wherein the input (i) identifies a particular image element and (ii) identifies an operation a user wants to perform with respect to the image element; identifying a context of the image, wherein the identifying the context comprises identifying (i) existing image elements already included within the image and (ii) attributes of the existing image elements; determining, based upon the context, attributes for the image element utilizing a knowledge store comprising information regarding attributes for image elements in view of (i) contexts and (ii) operations; and thereafter, performing the operation utilizing the image element having the attributes.

18 Claims, 4 Drawing Sheets

(56) References Cited

U.S. PATENT DOCUMENTS

| | | | |
|---|---|---|---|
| 2016/0110063 A1* | 4/2016 | Connolly | G06F 3/04842 |
| | | | 715/716 |
| 2016/0275724 A1 | 9/2016 | Adeyoola et al. | |
| 2018/0068478 A1* | 3/2018 | Chedeau | H04N 1/00196 |
| 2018/0357702 A1 | 12/2018 | Jain et al. | |
| 2020/0184278 A1* | 6/2020 | Zadeh | G06F 16/953 |

OTHER PUBLICATIONS

Ramesh Manuvinakurike et al., "Conversational Image Editing: Incremental Intent Identification in a New Dialogue Task", Proceedings of the SIGDIAL 2018 Conference, Melbourne, Australia, Jul. 12-14, 2018 12 pages, Association for Computational Linguistics.

Huikai Wu et al., "GP-GAN: Towards Realistic High-Resolution Image Blending", Mar. 25, 2017, 13 pages, arXiv:1703.07195v2 [cs.CV].

Hanock Kwak et al., "Generating Images Part by Part with Composite Generative Adversarial Networks", Nov. 14, 2016, 7 pages, arXiv:1607.05387v2 [cs.AI].

Chen-Hsuan Lin et al., "ST-GAN: Spatial Transformer Generative Adversarial Networks for Image Compositing", Mar. 5, 2018, 13 pages, arXiv:1803.01837v1 [cs.CV].

Levent Karacan et al., "Manipulating Attributes of Natural Scenes via Hallucination", Aug. 22, 2018, 15 pages, arXiv:1808.07413v1 [cs.CV].

Qiwen Fu et al., Image Inpainting and Object Removal with Deep Convolutional GAN, 2018, 7 pages, Copy available at: http://stanford.edu/class/ee367/Winter2018/fu_guan_yang_ee367_win18_report.pdf.

* cited by examiner

MULTISTEP INTERACTIVE IMAGE GENERATION UTILIZING KNOWLEDGE STORE

BACKGROUND

Creating and editing images is very common, particularly because many information handling devices (e.g., smartphones, wearable devices, laptop computers, tablets, etc.) have the ability to both capture images and edit images. Thus, a user can easily capture an image and then use the same device to edit the image. Additionally, creating a composite image (i.e., an image that is created from different image elements that are captured from different sources and placed together in a single image) is becoming easier due to image editing software having more user-friendly interfaces and, therefore, is easier to use without requiring specialized knowledge of image editing or specialized software. Additionally, many existing applications allow for easy editing of captured images or generation of composite images.

BRIEF SUMMARY

In summary, one aspect of the invention provides a method comprising: receiving, from a user, input for manipulating an image, wherein the input (i) identifies a particular image element and (ii) identifies an operation a user wants to perform with respect to the particular image element; identifying a context of the image, wherein the identifying the context comprises identifying (i) existing image elements already included within the image and (ii) attributes of the existing image elements; determining, based upon the context, attributes for the particular image element by utilizing a knowledge store comprising information regarding attributes for image elements in view of (i) contexts and (ii) operations; and thereafter, performing the operation utilizing the particular image element having the attributes.

Another aspect of the invention provides an apparatus, comprising: at least one processor; and a computer readable storage medium having computer readable program code embodied therewith and executable by the at least one processor, the computer readable program code comprising: computer readable program code configured to receive, from a user, input for manipulating an image, wherein the input (i) identifies a particular image element and (ii) identifies an operation a user wants to perform with respect to the particular image element; computer readable program code configured to identify a context of the image, wherein the identifying the context comprises identifying (i) existing image elements already included within the image and (ii) attributes of the existing image elements; computer readable program code configured to determine, based upon the context, attributes for the particular image element by utilizing a knowledge store comprising information regarding attributes for image elements in view of (i) contexts and (ii) operations; and computer readable program code configured to, thereafter, perform the operation utilizing the particular image element having the attributes.

An additional aspect of the invention provides a computer program product, comprising: a computer readable storage medium having computer readable program code embodied therewith, the computer readable program code executable by a processor and comprising: computer readable program code configured to receive, from a user, input for manipulating an image, wherein the input (i) identifies a particular image element and (ii) identifies an operation a user wants to perform with respect to the particular image element; computer readable program code configured to identify a context of the image, wherein the identifying the context comprises identifying (i) existing image elements already included within the image and (ii) attributes of the existing image elements; computer readable program code configured to determine, based upon the context, attributes for the particular image element by utilizing a knowledge store comprising information regarding attributes for image elements in view of (i) contexts and (ii) operations; and computer readable program code configured to, thereafter, perform the operation utilizing the particular image element having the attributes.

A further aspect of the invention provides a method, comprising: receiving a user query identifying a modification to an image, wherein the user query identifies (i) a component to be manipulated within the image and (ii) a manipulation to be performed on the component; identifying an object corresponding to the component by (i) parsing the user query and (ii) selecting the object based upon a semantic similarity to the user query; selecting, for the object, both (i) non-relative attributes and (ii) relative attributes, the relative attributes being based upon attributes of other components existing within the image, wherein the selecting comprises accessing a model comprising correlations of object attributes with (i) image contexts and (ii) manipulations to be performed on objects; and generating a modified version of the image by performing the manipulation with respect to (i) the component corresponding to the object and (ii) the image, wherein the component is assigned the (i) non-relative attributes and the (ii) relative attributes when manipulated within the image.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, all of the process steps, components and outputs discussed with respect to FIGS. 1-3 can be performed or utilized by way of a processing unit or units and system memory such as those indicated, respectively, at 16' and 28' in FIG. 4, whether on a server computer, a client computer, a node computer in a distributed network, or any combination thereof.

While image editing software has become easier to use and image editing applications have become more common, the number of features or edits that a user can make is generally fairly limited. While more expensive and specialized image editing software allows a user the freedom to make any changes or modifications to an image, including creating a composite image, the applications and software that are more accessible to an average user limit the types of edits that a user can make to a set of fixed edits or styles. Thus, if the user wants to make a more specialized or unique edit or modification, the user is unable to make such an edit if the application or software does not include instructions or options that would support such an edit. Thus, the user is confined to the simple set of fixed editing options that are provided within the software or application. The reason that the applications only support this fixed set of instructions is to reduce the amount of programming required for the application so that the application can be run on devices without requiring large amounts of processing and storage resources.

Additionally, in both the more specialized image editing software and the more user-friendly image editing options, the user has to make multiple iterations of changes in order to achieve a desired effect. For example, if a user wants to add a moon image element to an image of a night sky, the user must first select the desired moon image element from a file or another image. The moon image element is then placed in a predetermined location within the night sky image without regard to where a user may actually want to place the moon image element. The user then must make separate editing operations to change the size, placement, and color of the moon image element. All of these steps result in tedious and time-consuming image editing. While the user may be willing to expend such time and energy for special images, for example, editing wedding pictures, baby pictures, or the like, a user generally does not want to expend the same amount of time and energy for all images that a user may wish to edit or create, for example, social media images, collaborative images shared among friends, or the like.

Accordingly, the techniques and systems as described herein provide a system and technique for generating an image utilizing a multistep interactive system that performs operations on image elements utilizing a knowledge store to assign attributes to the image elements. The system may receive input for manipulating an image from a user. The image may be a background image or underlying image that a user wishes to edit or manipulate. The input may identify an image element and an operation that a user wants to perform with respect to the image element. An image element may be any object or other portion of either the underlying image or another image that the user wants to manipulate. For example, the image element may be a portion of another image that a user wants to add to the underlying image. As another example, the image element may be a portion of the underlying image that the user wants to delete from the underlying image. Thus, the operation may be the modification that the user wants to perform with regard to the image element. Example operations include: adding an image element, deleting an image element, moving an image element, changing an attribute (e.g., size, color, position, etc.) of an image element, or any other type of edit that a user can make to an image element.

The system identifies a context of the underlying image that identifies existing image elements within the image and attributes of those existing image elements. In other words, the system attempts to determine what image elements the current image includes and how these image elements are related to other image elements within the image. For example, the system may identify different objects within the image and also identify both fixed attributes of the image element (e.g., color, placement within the image, size, etc.) and relative attributes of the image elements as compared to other image elements (e.g., color relative to the colors of other image elements, size relative to the size of other image elements, etc.). The system then determines attributes for the image element that the user has identified. To determine these attributes the system accesses a knowledge store that provides information regarding attributes for image elements in view of different underlying contexts and desired operations. Once the attributes are determined, the system performs the requested operation utilizing the image element having the determined attributes. Thus, the system provides a multistep iterative process for generating the overall desired image by taking turns between receiving user input and the system predicting a next step in the image generation. If the system is not confident of a next step, the system can request additional input from the user.

Such a system provides a technical improvement over current systems for image editing and creation. Instead of merely providing only a fixed set of instructions that can be utilized to create and edit images, the described system allows for more specialized image edits and creations without requiring large amounts of processing and storage resources. Additionally, since the described system leverages a knowledge store, the system can make some initial edits to image elements in the form of modifying the image element attributes based upon the context of the underlying image, so that the user does not have to make as many edits to the image element to get the desired image. Thus, the system reduces the amount of time that a user must expend by reducing the number of edits and iterations that a user must make in order to achieve the desired result.

Accordingly, the system provides image editing that offers more editing options than a prefixed set of edit instructions as found in conventional systems, while maintaining the ease of use and less-resource intensive features found in applications other than the expensive, specialized, image editing software. Thus, the described system provides the convenience and ability to install on portable information handling devices as found in application-deployed image editing options and also an increased number of editing features as found in the expensive, specialized image editing software generally utilized by professional image editors. Additionally, the described system, by utilizing the knowledge store, reduces the number of iterations and time that a user must spend editing the images as compared to either of the traditional image editing options.

Figure 1:
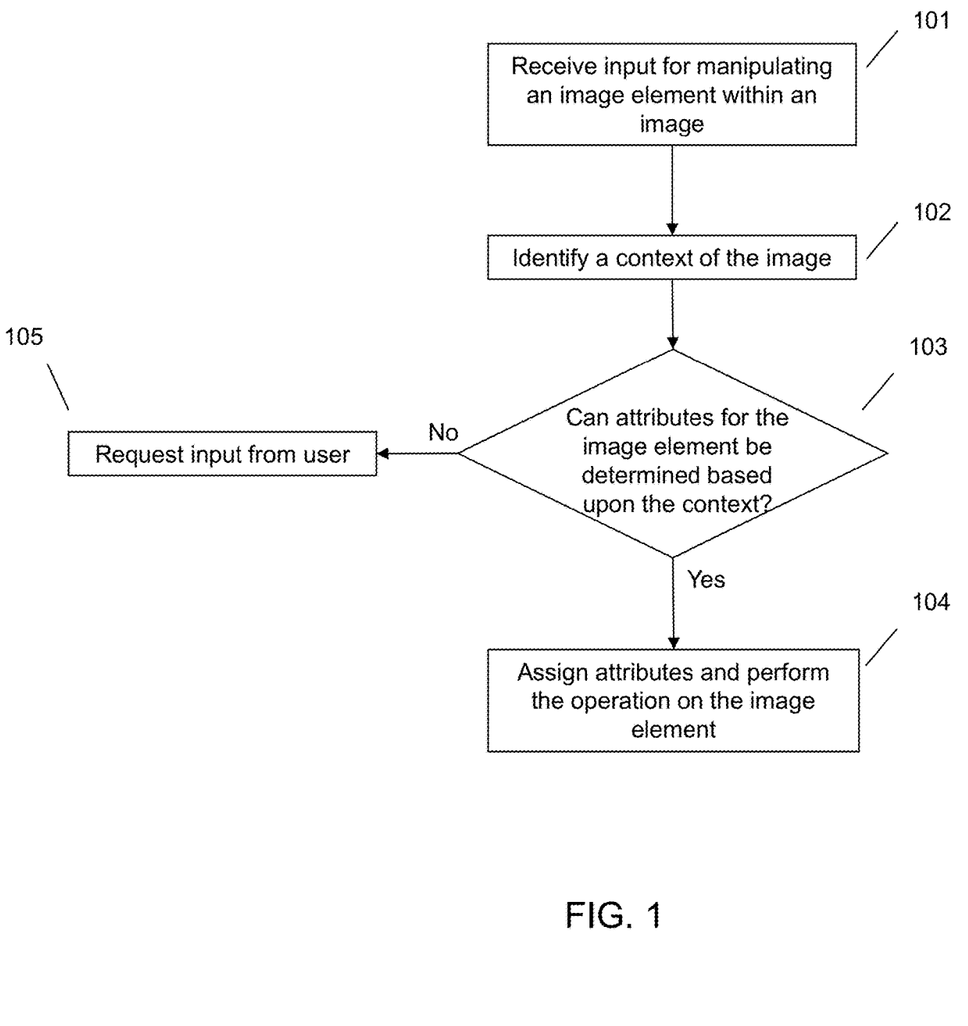
FIG. 1 illustrates a method of generating an image by performing operations on image elements utilizing a knowledge store to assign attributes to the image elements.
Figure 2:
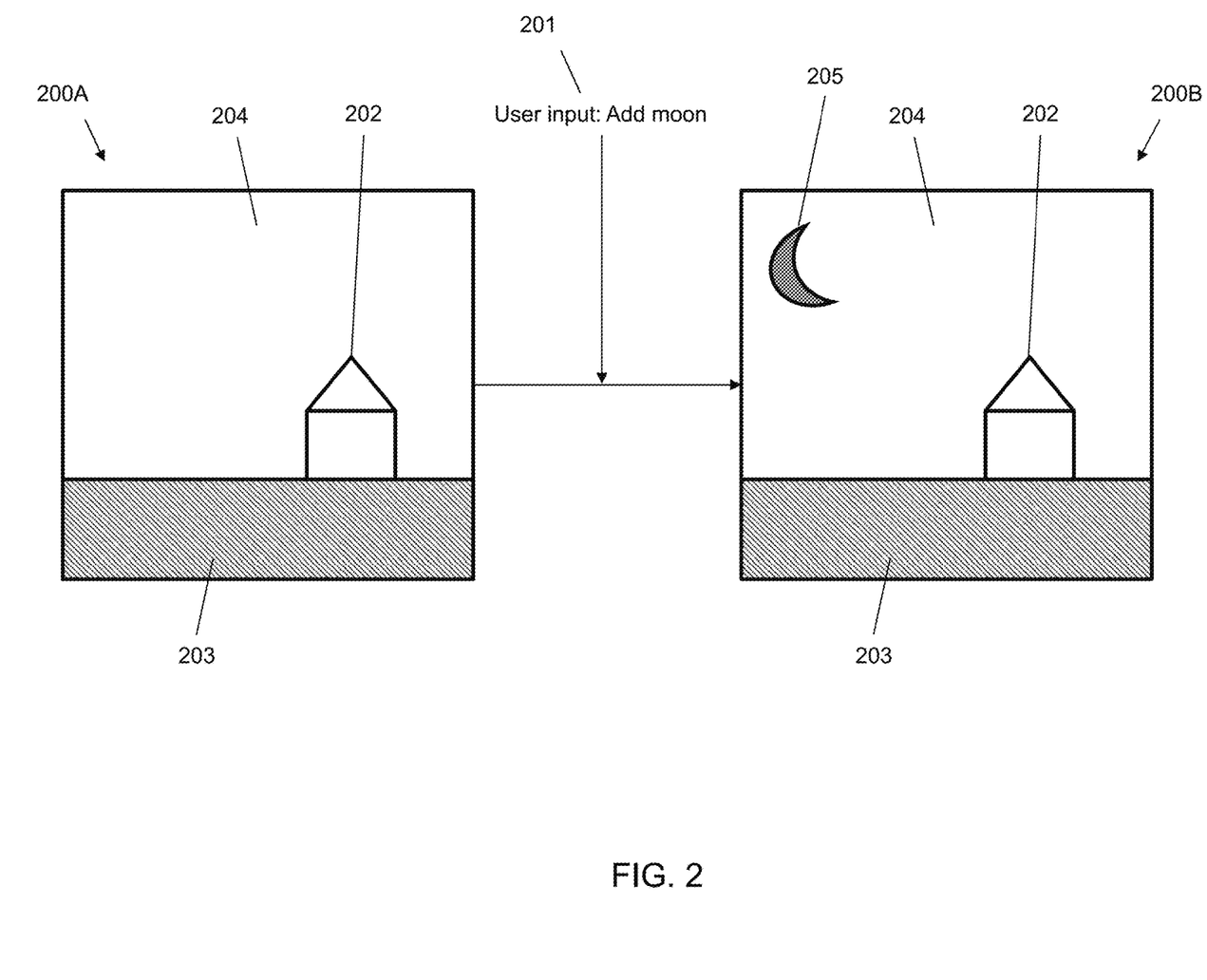
FIG. 2 illustrates an example addition of an image element identified in a user input and having attributes identified utilizing a knowledge store.

FIG. 1 illustrates a method for generating an image by performing operations on image elements utilizing a knowledge store to assign attributes to the image elements. At 101 the system receives, from a user, input for manipulating an image. The input may be received from any input modality. For example, the input may be received via audio or voice input with a user speaking to an information handling device. As another example, the input may be received via touch or mechanical input with a user providing input via a stylus or finger on a touch screen or a mouse or keyboard input. Additionally, the input may be received utilizing a combination of input modalities, for example, a user may start speaking "add a" and then draw a house on a touch screen, thereby providing an input indicating that a house should be added to an image.

The image to be manipulated may be an underlying image that the user currently has open or active on an information handling device. Accordingly, the input may identify both an image element and an operation that the user wants to perform with respect to the image element. The operation may include any manipulation that can be performed with respect to an image element. In other words, the operation may be any type of edit that could be performed on an image or image element. Example operations include, adding image elements, deleting or removing image elements, moving image elements, resizing image elements, recoloring image elements, changing the texture of image elements, rotating image elements, and the like.

An image element may be any object or portion of either the underlying image or another image. An image does not only include a picture or video captured utilizing image capture software. Rather, the image may also include different objects that a user can add to a document or application, for example, standard shapes, lines, icons, emoticons or emojis, and the like. Thus, the image element may include any of these different objects or portions of these objects or an image. For example, a user may select a portion of an image of a basketball as the image element. It should also be understood that the image element can be any portion of an image. In other words, the image element does not have to be a complete image or portion of an object within an image. For example, a user may simply select half of a basketball as the image element.

Additionally, the user does not have to specifically select the image element. In other words, the user does not have to find the desired image element and specifically identify the found object as the image element. Rather, the user may simply provide a query that identifies what object the user is utilizing as the image element. For example, the user may simply provide a query stating "add a moon", without identifying the type of moon, an underlying image file or location having the desired moon, or any other information regarding the desired moon. As another example, the user may provide a query stating "move the desk" for an underlying image having a desk, without selecting the desk in the underlying image, identifying where to move the desk within the image, or any other information with respect to the desk. As another example, the user may simply draw an image element, for example, utilizing a stylus and touch screen, on the underlying image. The drawn image element may then be utilized as the query or input to identify the image element and the desired operation.

Before performing the manipulation, the system may identify a context of the underlying image at 102. Identifying a context of the image includes identifying existing image elements, or image elements already included in the underlying image, and attributes of the existing image elements. To identify the context the system may employ image analysis techniques, image parsing techniques, and the like. Effectively, the system is attempting to identify what image elements are already included in the image and the relationship of the image elements to other image elements. In identifying the context, the system may identify a category or type of the image elements, for example, people, animals, event type, landscape, and the like. This information can be used to help identify an overall category or real-world context for the underlying image, for example, the image is an image of a landscape, the image is a portrait, the image is a close-up of an animal, the image is an image of an interior space, or the like.

Additionally, in identifying the context, the system identifies both the fixed or individual attributes and the relative attributes of the existing image elements. Fixed attributes includes those attributes that are intrinsic to the image element, for example, the particular color(s) of the image element, the size/dimensions of the image element, the placement of the image element within the underlying image, and the like. The fixed attributes are those attributes of the image element that are not relative to other image elements.

The system also identifies relative attributes of the existing image elements. These attributes are attributes that are relative to other image elements within the image. For example, the system may determine the relative size of the image element with respect to another image element (e.g., is the image element bigger than another image element, what are the size proportions of the image element as compared to another image element, etc.). As another example, the system may determine the relative color of the image element with respect to another image element (e.g., is the image element a darker shade of red than another image element, does the image element have more gradient than another image element, etc.). As another example, the system may determine the relative placement of the image element with respect to another image element (e.g., is the image element to the left of another image element, is the image element in front of another image element, is the image element rotated with respect to another image element, etc.). It should be understood that the identified fixed and relative attributes are merely examples and are not intended to be an exhaustive list as other fixed and relative attributes can be identified.

At 103, the system may determine if attributes for the image element that the user has identified can be determined utilizing the determined context. To determine attributes for the image element, the system may access a knowledge store that contains image element attribute information correlated to contexts and operations. The knowledge store may be a model or machine-learning model, database having correlations, or the like. The attributes that can be identified from the knowledge store include any fixed or relative attributes of the image element, for example, those fixed and relative attributes discussed above with respect to determining the context of the image. To identify the attributes, the system may query the knowledge store with a query based upon the image element, the context of the underlying image, and the operation that the user wants to perform on the image element. As an example, referring to FIG. 2, the user has an underlying image 200A that includes a house 202, the ground 203, and the sky 204. The user provides a query or input 201 to add a moon to the underlying image. The system utilizes the image element of the query (i.e., moon), the context of the underlying image (e.g., a house having ground in the foreground and sky in the background), and the operation (i.e., add), to query the knowledge store to determine attributes that should be assigned to the image element (i.e., moon).

The knowledge store may include information that identifies correlations between contexts and operations and attributes of image elements. The knowledge store may also include information regarding a real-world context of the image element. A real-world context may indicate how such an image element would be normally perceived in the real-world and may include attribute information such as a typical color of the image element, a relative size of an image element with respect to other common objects that the image element is seen with, and the like. Thus, using the example of FIG. 2, the knowledge store may identify that the real-world context of the moon is that it is in the sky and that it is normally a particular color. Using the context of the underlying image, the knowledge store may identify that it should be a smaller size of the house and should be placed in a corner opposite the house and above the ground. In other words, the knowledge store provides information regarding common sense attributes for the image element. Thus, the system understands the scene or underlying image and leverages common sense or real-world knowledge to generate or modify the image element based upon the input received by the user at 101. In other words, the system attempts to leverage common sense knowledge from the visual inputs to assist in editing or creating an image utilizing a knowledge store, for example, a machine-learning model.

Either before or after the attributes are determined for the image element, the system may retrieve an image element based upon the user input. For example, if the user wishes to add an image element, the system may first need to locate the image element, for example, from the Internet, a database, local storage, or other data storage location. There are likely multiple different files or images that are either of the image element or contain the image element. Thus, to determine which image element to utilize, the system may identify the image element from the possible image elements that is a "best-fit" based upon the user input. In other words, the system may select and retrieve an image element that is semantically similar to the input received by the user that identified the image element. Similarity can be determined using one or more conventional similarity techniques. In the case that the image element is retrieved before determining the attributes, the system can modify the retrieved image element utilizing the determined attributes. In the case that the image element is retrieved after determining the attributes, the system can utilize the determined attributes in selecting an image element, for example, by including the attributes within a query for the image element. The image element may also be additionally modified using the determined attributes after being retrieved.

If attributes cannot be determined at 103, the system may request input from a user at 105. For example, if the system is not confident of the next manipulation or attribute for an image element, the system may determine that the attributes cannot be determined and request additional user input. The input requested may include requesting the user to provide input regarding the attributes for the image element. One reason that the system may not be able to determine the attributes is that the image element in view of either the context or operation is not included within the knowledge store. In other words, the knowledge store does not include an identification of attributes for the particular image element in view of the context of the underlying image and the operation that the user wants to perform on the image element. The system may also request input from a user at 105 if some of the attributes cannot be determined at 103. For example, the knowledge store may contain information that identifies some of the attributes, but may be missing information that identifies other attributes. In this case, the system may request that the user provide input identifying these missing attributes.

If, on the other hand, attributes for the image element can be determined at 103, the system may assign the attributes to the image element and then perform the operation identified by the user using the image element having the attributes at 104. For example, if the user wanted to add a moon to the image, the system may add the moon to the image in a location that makes sense (i.e., in the sky), at a size that is proportionally correct with respect to the other image elements, and having a real-world context color, meaning a color that is similar to a color of the moon that would be seen in the real-world. While the example of utilizing an image element that is not already included in the underlying image has been used throughout, it should be understood that the described system and techniques can also be used on existing image elements, for example, moving an existing image element, deleting an existing image element, recoloring an existing image element, and the like.

The generation of the overall image is an iterative multi-step process of receiving user input and the system predicting the next manipulation. In other words, the process continues for different image elements with the system attempting to predict the next manipulation based upon received user inputs. If the system is able to predict the next manipulation in the generation of the overall image, the system performs that manipulation. If, on the other hand, the system is less confident regarding the manipulation, for example, a confidence score associated with the manipulation is below a predetermined threshold, the system may request input from the user either confirming a manipulation or performing the manipulation manually. As the user provides input, the system can store the input in a database or knowledge store for subsequent image manipulations/generations. This knowledge store may be utilized for image manipulations/generations unique to the user or may be stored in a data storage location accessible by the system to be utilized for any user. Accordingly, the system attempts to reduce the number of iterations and edits that a user has to perform to achieve the desired image, thereby reducing the amount of human intervention required for generating the image.

Once the system performs the desired operation with the image element having the assigned attributes, the user may choose to make changes to the image element. For example, if the user does not like where the system has positioned the image element, the user may provide editing input to move the image element. As another example, if the user does not like the color of the image element, the user may provide editing input to recolor the image element. As a user provides this input or feedback, the system may utilize these editing inputs to further refine the knowledge store. In other words, the system may update the knowledge store with the new information that has been received by the user. In this respect, the knowledge store is a machine-learning model that learns over time as additional inputs are received. Then as subsequent requests for image elements are received, the attributes assigned to the image elements can be more accurate or more likely to be what is desired by the user because the machine-learning model becomes more refined.

Figure 3:
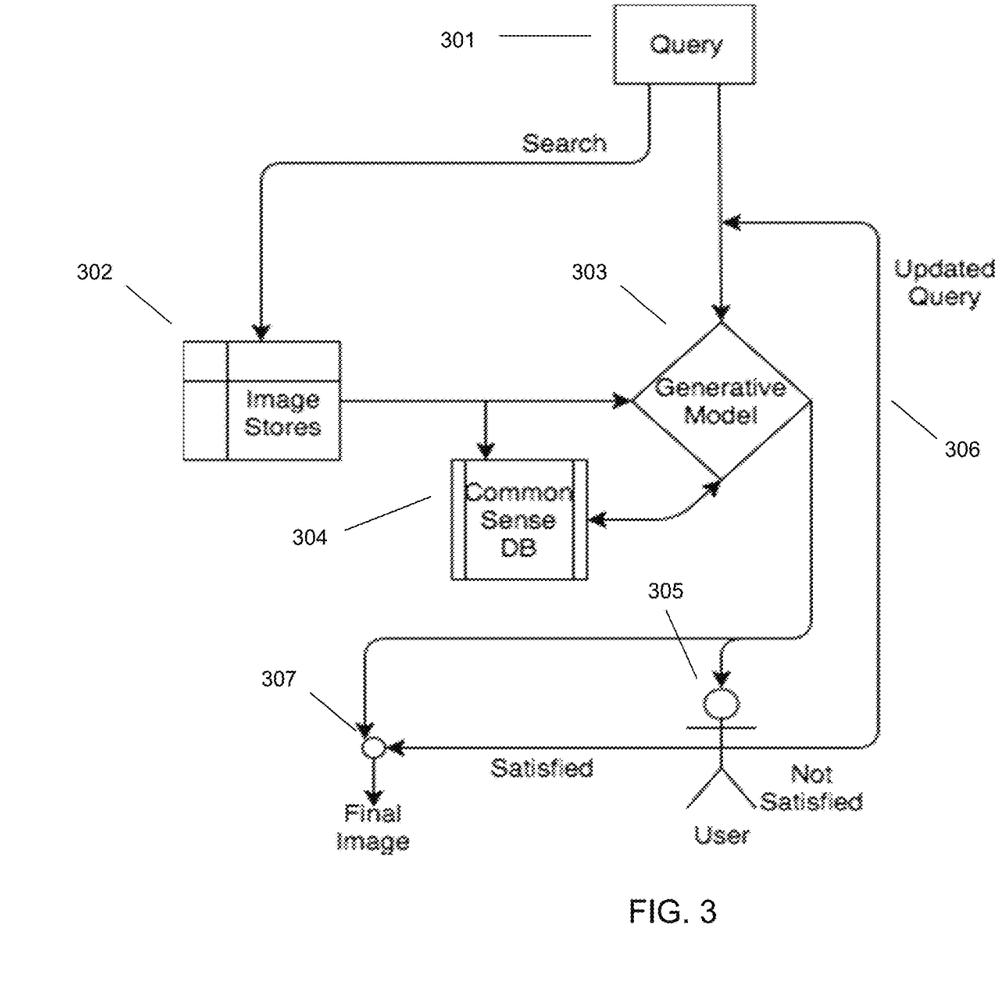
FIG. 3 illustrates an example flow chart of an iterative identification and assignment of attributes to image elements.

FIG. 3 illustrates an example flow diagram for generating an image. At 301 a user query or input is received. The query is used to perform a search on an image store 302 to find an image corresponding to the image element or object of the query 301. The query is also fed to a generative model 303 that assists in generating the image element or object. The generative model utilizes a common sense database 304 to identify attributes for the image element or object of the query 301. Once the system assigns the attributes to the image element, this image element is provided to the user 305 in the form of adding it to the image. If the user is not satisfied, the user can either manually change the attributes or the system can perform an updated query 306. If or once the user is satisfied, the image element having the final attributes can be added to the image to create the final image 307.

Thus, the described system and method provides an improvement to conventional systems for image editing and creation by providing a system that can leverage a knowledge store to identify common sense attributes for image elements, thereby decreasing the amount of input that a user must provide to generate a desired image. Rather than forcing a user to only utilize a fixed set of edit options as with conventional image editing software, the described system allows for more editing options by leveraging the knowledge store. Additionally, by utilizing an off-device knowledge store the described system does not require the processing and storage resources of more expensive, specialized image editing software, while still allowing for more diverse image edits. The use of the knowledge store to make initial edits to the attributes of image elements based upon other, existing image elements, the described system reduces the amount of time that a user must spend editing the image by reducing the number of edits and iterations that a user must make to achieve the desired image.

Figure 4:
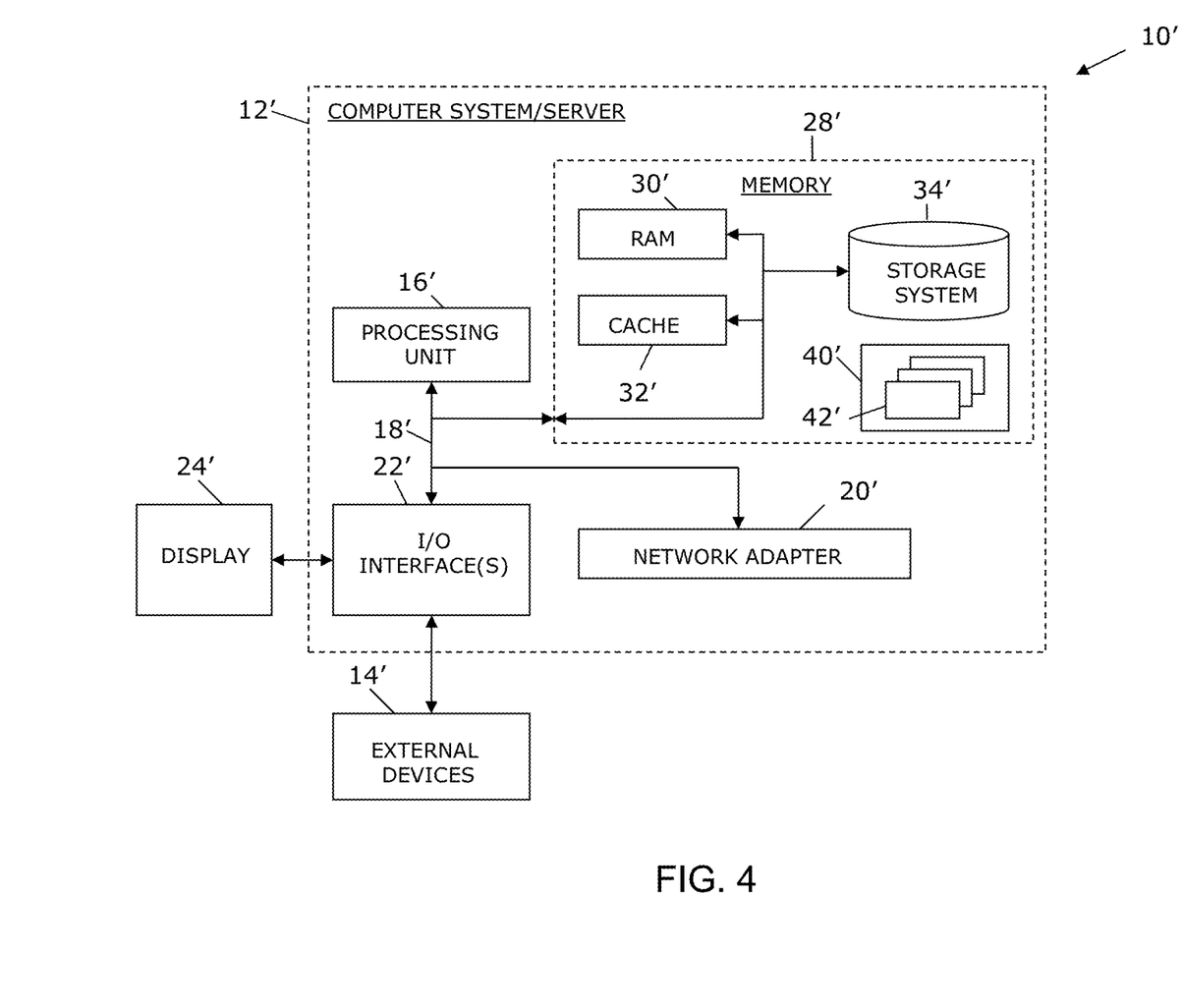
FIG. 4 illustrates a computer system.

As shown in FIG. 4, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
    receiving, at a processing device and from a user, input for manipulating an image, wherein the input (i) identifies a particular image element and (ii) identifies an operation a user wants to perform with respect to the particular image element;
    identifying, using an image analyzer, a context of the image, wherein the identifying the context comprises identifying (i) existing image elements already included within the image and (ii) attributes of the existing image elements;
    determining, using the processing device and based upon the context, attributes for the particular image element by accessing and utilizing a knowledge store comprising information regarding attributes for image elements in view of (i) contexts and (ii) operations, wherein the determining comprises (i) identifying the knowledge store is missing information regarding at least one of said attributes and (ii) requesting input from the user identifying at least a portion of said at least one attribute; and
    thereafter, performing, using the processing device, the operation utilizing the particular image element having the attributes.

2. The method of claim 1, comprising (i) retrieving an image element based upon a semantic similarity of the retrieved image element with respect to the input identifying the particular image element, and (ii) thereafter modifying the retrieved image element based upon the attributes.

3. The method of claim 1, comprising receiving, after modifying the particular image element utilizing the attributes, user feedback identifying a modification to attributes of the modified particular image element.

4. The method of claim 3, comprising updating the knowledge store based upon the user feedback.

5. The method of claim 1, wherein the knowledge store comprises attributes for image elements in view of a real-world context of an image element.

6. The method of claim 1, wherein the attributes comprise (i) non-relative attributes of the particular image element and (ii) relative attributes of the particular image element, the relative attributes being relative to attributes of the existing image elements.

7. The method of claim 1, wherein the operation is selected from the group consisting of: adding an image element, resizing an image element, recoloring an image element, removing an image element, and moving an image element.

8. The method of claim 1, wherein the receiving input comprises receiving input of different modalities.

9. The method of claim 1, wherein the knowledge store comprises a machine-learning model.

10. An apparatus, comprising:
    at least one processor; and
    a non-transitory computer readable storage medium having computer readable program code embodied therewith and executable by the at least one processor, the computer readable program code comprising:
    computer readable program code configured to receive, at a processing device comprising the processor and from a user, input for manipulating an image, wherein the input (i) identifies a particular image element and (ii) identifies an operation a user wants to perform with respect to the particular image element;
    computer readable program code configured to identify, using an image analyzer, a context of the image, wherein the identifying the context comprises identifying (i) existing image elements already included within the image and (ii) attributes of the existing image elements;
    computer readable program code configured to determine, using the processing device and based upon the context, attributes for the particular image element by accessing and utilizing a knowledge store comprising information regarding attributes for image elements in view of (i) contexts and (ii) operations, wherein the determining comprises (i) identifying the knowledge store is missing information regarding at least one of said attributes and (ii) requesting input from the user identifying at least a portion of said at least one attribute; and
    computer readable program code configured to, thereafter, perform, using the processing device, the operation utilizing the particular image element having the attributes.

11. A computer program product, comprising:
    a non-transitory computer readable storage medium having computer readable program code embodied therewith, the computer readable program code executable by a processor and comprising:
    computer readable program code configured to receive, at a processing device comprising the processor and from a user, input for manipulating an image, wherein the input (i) identifies a particular image element and (ii) identifies an operation a user wants to perform with respect to the particular image element;
    computer readable program code configured to identify, using an image analyzer, a context of the image, wherein the identifying the context comprises identifying (i) existing image elements already included within the image and (ii) attributes of the existing image elements;
    computer readable program code configured to determine, using the processing device and based upon the context, attributes for the particular image element by accessing and utilizing a knowledge store comprising information regarding attributes for image elements in view of (i) contexts and (ii) operations, wherein the determining comprises (i) identifying the knowledge store is missing information regarding at least one of said attributes and (ii) requesting input from the user identifying at least a portion of said at least one attribute; and computer readable program code configured to, thereafter, perform, using the processing device, the operation utilizing the particular image element having the attributes.

12. The computer program product of claim 11, comprising (i) retrieving an image element based upon a semantic similarity of the retrieved image element with respect to the input identifying the particular image element, and (ii) thereafter modifying the retrieved image element based upon the attributes.

13. The computer program product of claim 11, comprising receiving, after modifying the particular image element utilizing the attributes, user feedback identifying a modification to attributes of the modified particular image element.

14. The computer program product of claim 13, comprising updating the knowledge store based upon the user feedback.

15. The computer program product of claim 11, wherein the knowledge store comprises attributes for image elements in view of a real-world context of an image element.

16. The computer program product of claim 11, wherein the attributes comprise (i) non-relative attributes of the particular image element and (ii) relative attributes of the particular image element, the relative attributes being relative to attributes of the existing image elements.

17. The computer program product of claim 11, wherein the operation is selected from the group consisting of: adding an image element, resizing an image element, recoloring an image element, removing an image element, and moving an image element.

18. A method, comprising:

receiving, at a processing device, a user query identifying a modification to an image, wherein the user query identifies (i) a component to be manipulated within the image and (ii) a manipulation to be performed on the component;

identifying, using an image analyzer, an object corresponding to the component by (i) parsing the user query and (ii) selecting the object based upon a semantic similarity to the user query;

selecting, using the processing device and for the object, both (i) non-relative attributes and (ii) relative attributes, the relative attributes being based upon attributes of other components existing within the image, wherein the selecting comprises accessing a model comprising correlations of object attributes with (i) image contexts and (ii) manipulations to be performed on objects; and generating, using the processing device, a modified version of the image by performing the manipulation with respect to (i) the component corresponding to the object and (ii) the image, wherein the component is assigned the (i) non-relative attributes and the (ii) relative attributes when manipulated within the image.

\* \* \* \* \*